June 1, 1926.
A. RIEBE
1,587,184
BALL BEARING
Filed Jan. 22, 1925
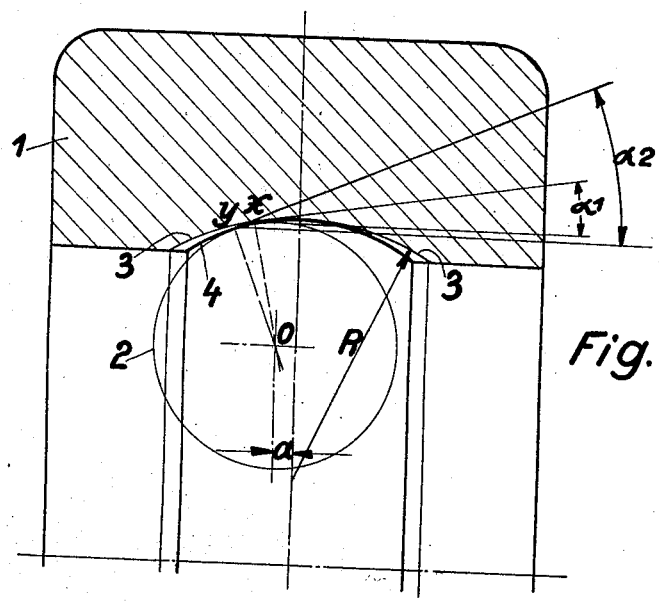
Fig. 1.
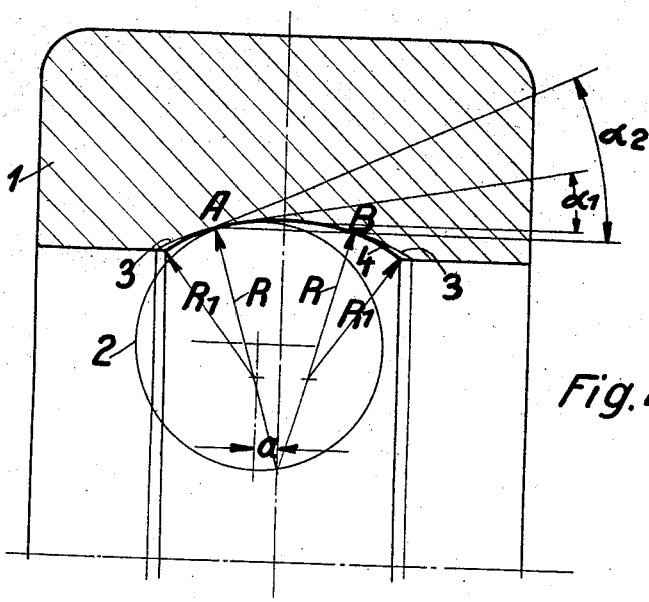
Fig. 2.
Fig. 3.
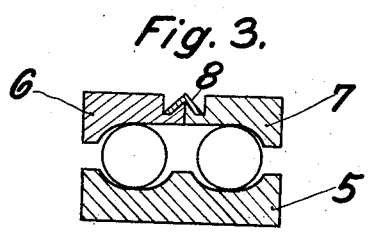
Inventor:
August Riebe
By Marks & Clerk
Attys.

Patented June 1, 1926.

1,587,184

UNITED STATES PATENT OFFICE.

AUGUST RIEBE, OF BERLIN-SCHMOCKWITZ, GERMANY.

BALL BEARING.

Application filed January 22, 1925, Serial No. 4,088, and in Germany January 17, 1921.

My invention is directed to improvements in ball bearings with two grooved rings being able to move a certain limited distance relatively to one another in axial direction and has for its object to so construct bearings of this character that a higher axial load will be admissible than heretofore.

In case of axial movement the points of contact between the balls and the annular groove of the ball-race or supporting ring necessarily lie a little beside the median plane of the ball-races, since their curvature in the cross-section is of larger radius than that of the balls embedded therein. For it is usual to give the annular groove a cross-sectional shape of an arc of a circle the radius of which is somewhat greater than that of the balls in order that the load may be increased beyond the degree which would be admissible if the ball races would be of cylindrical shape. Theoretically, it is true, the greatest load is applicable if the radii of the cross section of the groove and of the balls are the same, but in this case there would not be a point contact between the two, but rather a curvilinear contact and instead of a rolling friction a sliding friction would prevail.

With the hereinbefore stated object in view I construct the annular races, tracks or grooves in such a manner that the cross-sectional line thereof has not the shape of an arc of a circle with a constant curvature but is of such a cross sectional shape, that in case of an axial movement or load the angle of the tangent in the point of contact of the balls becomes larger than the angle for a cross sectional curve with circular shape. The curve may be of smooth continuity or broken with corners or of any other suitable shape, for instance a curve of gradually increasing curvature in outward direction or a curve composed of arcs of a circle. In the latter case the single arcs of a circle may go over into each other tangentially or meet each other with a corner. The shape of the cross sectional curves is merely important in this respect that at the apex, where the balls contact at mere axial load, the curvature shall be the same as heretofore with a ball race of circular cross sectional shape in its whole extension, while the inclination of the curve more outwardly, where the balls contact at an axial movement, is larger than heretofore with a ball race of circular cross sectional shape. It is also possible to compose several curves or straight lines and curves. The cross sectional curve may be an ellipse, a parabola or an hyperbola.

In case of employing a cross sectional curve of the kind described, I ensure the advantage of giving at a lateral displacement of the balls the contact points of the balls a considerably greater inclination as compared with a circular curve as hitherto employed, without thereby reducing the admissible radial load. For also the new cross sectional curves are designed to possess at the vertex, that is to say, the point of contact with the balls at a mere radial load no other curvature than heretofore usual with circular cross sectional curves.

In the drawings forming a part of this specification I have shown, by way of example, a few embodiments of my invention. In the drawings Figure 1 is a cross-sectional view of the outer ring of a ball bearing with one ball shown in the position of a certain lateral displacement the ball race having a cross-section of an outwardly constantly increasing curvature. Figure 2 is a similar view, but in this modification the cross sectional curve of the ball race is composed of two arcs of a circle of different diameters. Figure 3 is a further embodiment of the invention showing a cross-sectional view of the rings of a compound or twin ball bearing wherein the ball races are composed, in cross-section of straight lines and curves.

Referring to the embodiment illustrated in Figure 1, 1 designates the outer ring or ball-race of a ball bearing of usual construction with the sole exception of the shape of the groove, and 2 denotes one of the balls. For comparison and in order to clearly distinguish the difference between the old art and my invention I have shown in Figure 1 the sectional curve of the groove, as hitherto employed, by a fine line 3 whilst the elliptic curve according to my invention is shown by a heavy line 4. Now, when the ball is caused to laterally diverge or move, as shown in the figure, for the amount $a$, which I call lateral divergence, the centre of the ball will adopt the position O as shown. The point of contact X of the ball and the curve 3 having the radius R then would have an inclination denoted by the angle $a^1$, whilst in the curve 4 designed according to my invention the ball will, at the like amount of lateral divergence, contact with the curve 4 at Y affording an angle of inclination like $a^2$ which is considerably greater than the angle $a^1$ in a ball bearing of usual construction.

In the embodiment shown in Figure 2 the ball 2 is laterally displaced in the ball-race 1 for a similar amount $a$. The sectional curve of the ball race is composed of a median section A—B which is an arc of a circle having the radius R, whilst the two curvatures extending laterally to the right hand side and to the left hand side therefrom, that is to say from B and A correspond to arcs of a circle having the radius $R^1$. For comparison also in this figure a fine line 3 denotes the curve as hitherto employed in ball bearings. It will be seen that the angle of contact or inclination $\alpha^2$ is by far greater in the new design than the like angle $\alpha^1$ in the old design, just as shown in Figure 1.

In the bearing with two sets of balls illustrated in Figure 3 the inner ring 5 consists of a single piece while the outer ring is composed of two sections 6 and 7, which are united with each other in any suitable way e. g. by means of a clamping ring 8 or the like. Each of the two grooves in the inner ring is constructed and shaped in the manner described with reference to Figure 1 or Figure 2 whereas the composed sectional curve of the outer rings is combined of a median straight section and two lateral sections extending therefrom to the right and the left hand sides and shaped in the manner explained with reference to Figure 1 or Figure 2.

From the foregoing description it will be seen that simple and efficient means are herein provided for accomplishing the objects of the invention and that the latter may be embodied in quite a variety of constructional modifications. Either the inner ring or the outer ring or ball-race alone may be constructed according to the idea of my invention, but, if required or desired, both rings may be constructed according to my invention. Moreover, also so-called oscillating ball bearings may be constructed according to my invention, that is to say, ball-bearings in which the inner ring and the outer ring or ball-race are arranged so as to be free to move relatively to each other for a certain extent towards the one or the other side of the bearing.

I have not attempted to explain all of the minute details of a ball bearing, for it will be understood by those to whom this specification is addressed, that the parts will be of the proper size and relationship; but while the elements shown and described are well adapted to serve the purposes for which they are intended, it is to be understood that the invention is not limited to the precise construction set forth, but includes within its purview such changes as may be made within the scope of the appended claims.

What I claim is:—

1. A ball bearing capable of a certain limited axial movement and having ball races curvilinear in cross section the curvature of the ball races being such that the tangent in the point of contact of the balls with the races in case of axial movements has a larger inclination than heretofore in said ball bearings with ball races circular in cross section.

2. A ball bearing capable of a certain limited axial movement and having ball races of a curvalinear cross section, said ball races being shaped to form a part of an ellipse the curvature of which increases continuously and smoothly outwardly from the median line or plane.

In testimony whereof I have signed my name to this specification.

AUGUST RIEBE.